United States Patent [19]

Petruzzelli

[11] Patent Number: 5,959,592
[45] Date of Patent: Sep. 28, 1999

[54] "IF" BANDSTACKED LOW NOISE BLOCK CONVERTER COMBINED WITH DIPLEXER

[75] Inventor: Edmund F. Petruzzelli, Greenwood Village, Colo.

[73] Assignee: EchoStar Engineering Corporation, Littleton, Colo.

[21] Appl. No.: 08/818,250

[22] Filed: Mar. 14, 1997

Related U.S. Application Data

[60] Provisional application No. 60/013,569, Mar. 18, 1996.

[51] Int. Cl.$^6$ .............................. H01Q 19/12; H04B 1/18
[52] U.S. Cl. .......................... 343/840; 343/756; 343/786; 455/188; 455/328; 380/10
[58] Field of Search ..................................... 343/840, 756, 343/772, 775, 786; 455/293, 188, 328, 3.2; 380/10; 358/349; H01Q 19/12, 19/00, 13/00; H04B 1/18; H04H 1/00

[56] References Cited

U.S. PATENT DOCUMENTS

| | | | |
|---|---|---|---|
| 4,397,037 | 8/1983 | Theriault | 455/188 |
| 4,675,732 | 6/1987 | Oleson | 358/349 |
| 5,073,930 | 12/1991 | Green et al. | 380/10 |
| 5,119,509 | 6/1992 | Kang | 455/328 |
| 5,260,713 | 11/1993 | Motson | 343/756 |
| 5,276,904 | 1/1994 | Mutzig et al. | 455/3.2 |
| 5,309,167 | 5/1994 | Cluniat et al. | 343/840 |
| 5,434,585 | 7/1995 | Harris | 343/786 |

FOREIGN PATENT DOCUMENTS

| | | | |
|---|---|---|---|
| 000576012A2 | 12/1993 | European Pat. Off. | H04N 1/00 |
| 405129977 | 5/1993 | Japan | H04B 1/18 |

*Primary Examiner*—Don Wong
*Assistant Examiner*—Hoang Nguyen
*Attorney, Agent, or Firm*—Pittenger & Smith, P.C.

[57] ABSTRACT

An arrangement is provided for combining the video and audio signals from a satellite antenna with other auxiliary input signals producing a frequency stacked band arrangement for transmission by a single cable to a satellite receiver or TV monitor located within a home or structure. Multiple TV input signals from the satellite antenna are processed and separated into intermediate frequency bands which are then combined in a diplexer with one or more auxiliary input frequency bands. The output of the diplexer is connected directly to the signal output terminal at the antenna. All components for performing this combining process are included within the sealed housing of the LNB provided at the satellite antenna. Improved band isolation and reduced noise and interference are produced by the novel arrangement.

9 Claims, 4 Drawing Sheets

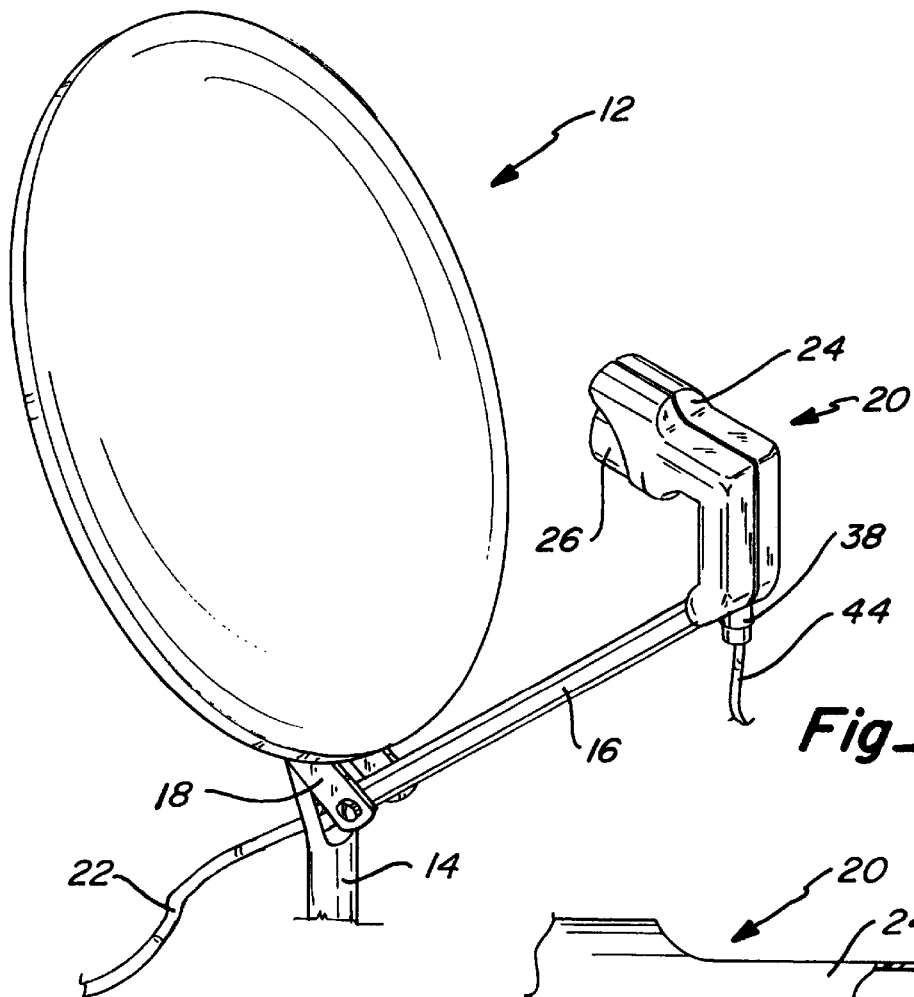
Fig_2
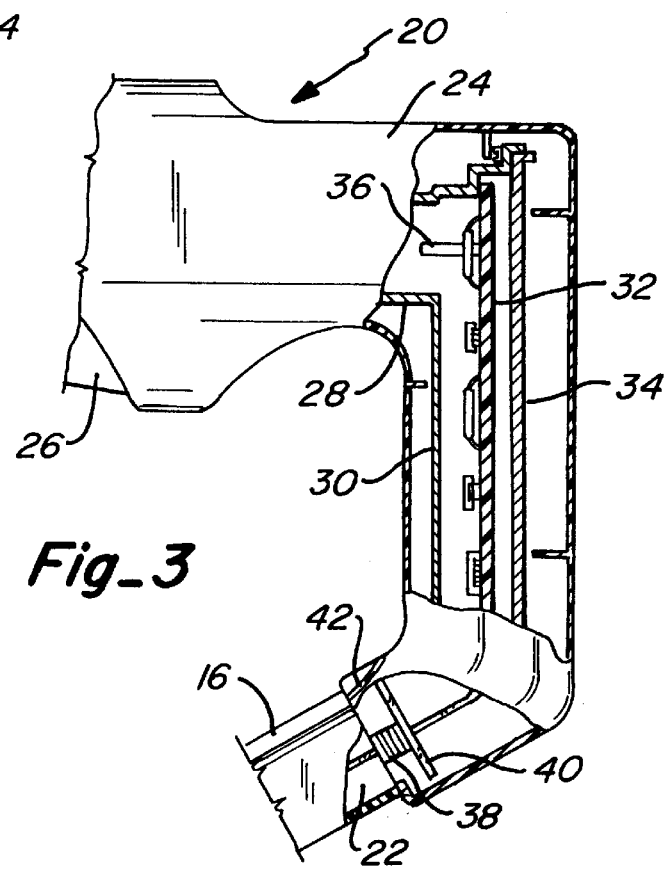
Fig_3

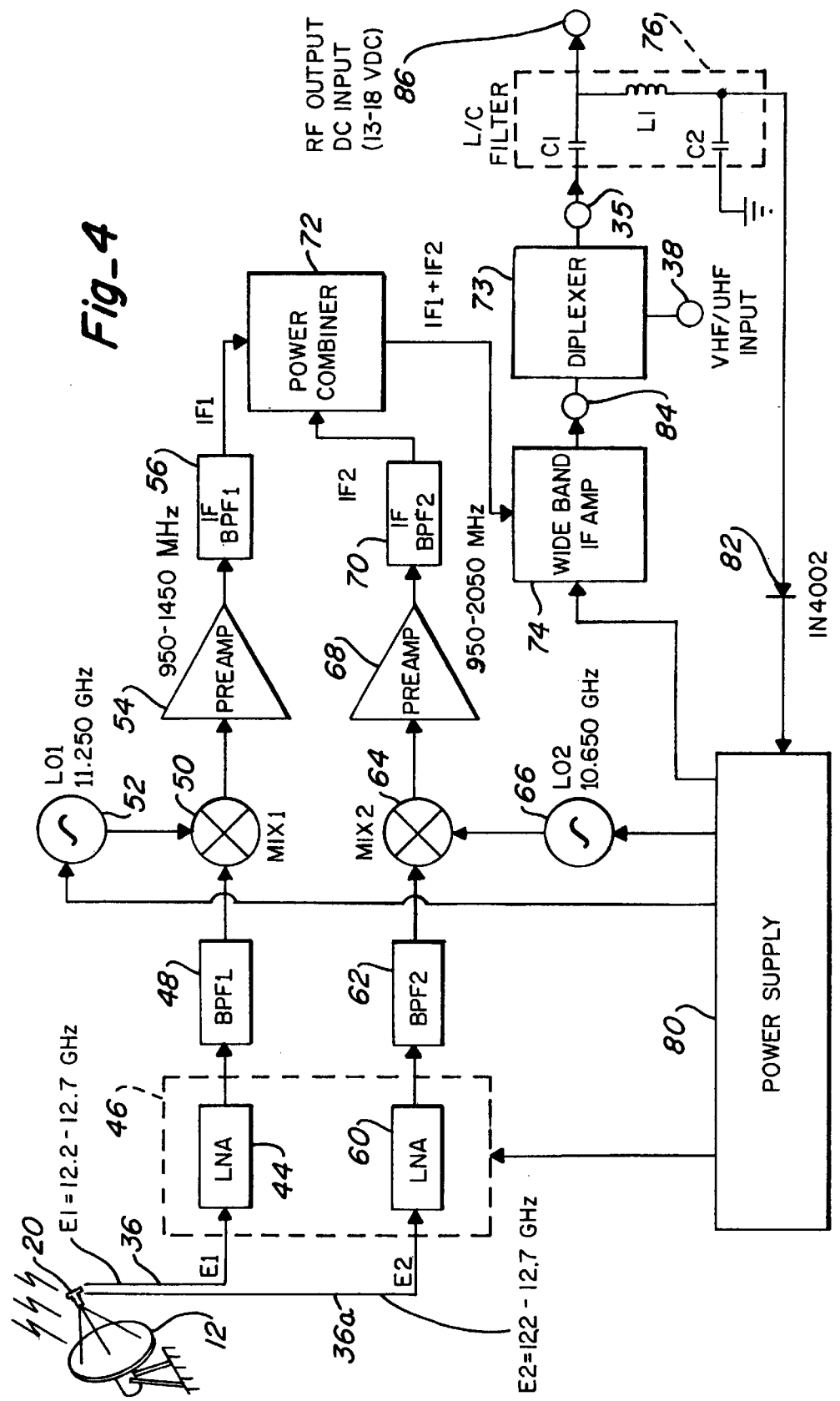

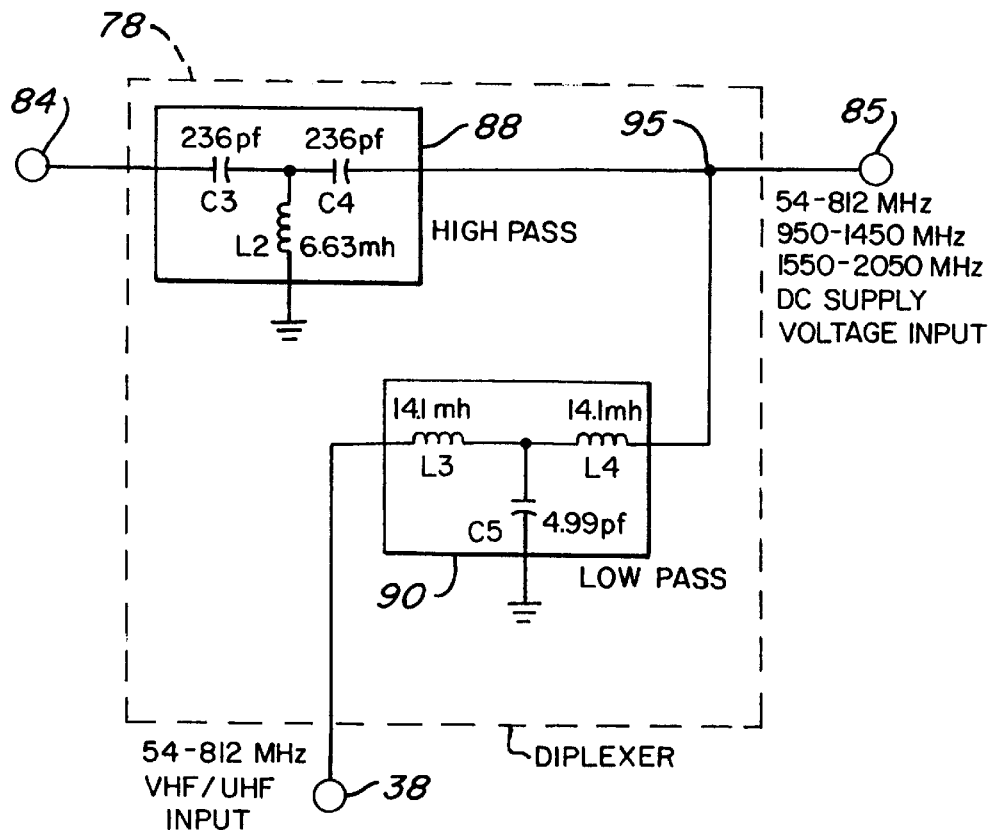
Fig_5
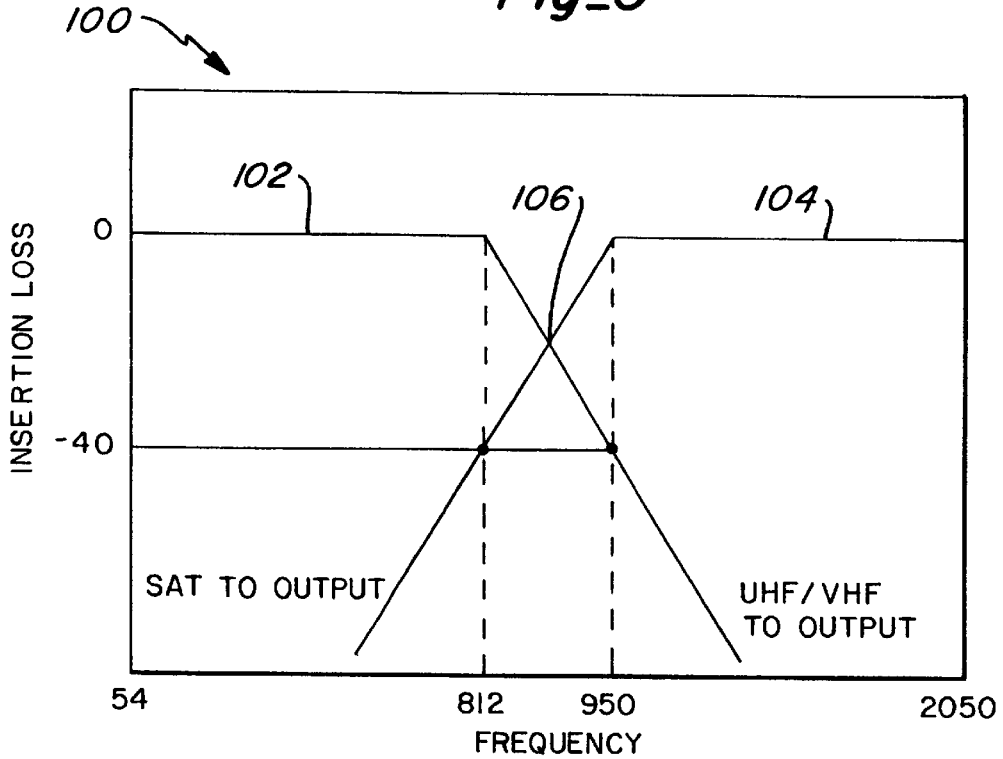
Fig_6

"IF" BANDSTACKED LOW NOISE BLOCK CONVERTER COMBINED WITH DIPLEXER

RELATED APPLICATIONS

This application claims the benefit of U.S. provisional application No. 60/013,569, filed Mar. 18, 1996.

FIELD OF THE INVENTION

This invention is directed to a combined LNB and diplexer mounted within a single microwave antenna feed housing. It is more specifically directed to the packaging of the electronic circuits of an LNB and a diplexer in the feed housing of a satellite receiving antenna so that the combined incoming RF signals from the satellite system and a terrestrial antenna can be fed simultaneously through an inexpensive coaxial cable to an appropriate TV receiver.

BACKGROUND OF THE INVENTION

In the past, it has been common practice to provide a low noise amplifier as well as a block down converter within the antenna feed housing for a parabolic or concave microwave antenna. As is well known, radio frequency microwave energy strikes the surface of the parabolic antenna and is reflected to a focal point or locus where a feedhorn or feed is strategically positioned. The RF energy received is coupled to a wave guide which directs the radio frequency energy to the antenna probes. The received energy, whether in the "C-band" or "Ku-band" is amplified in a low noise amplifier to boost the strength of the signal and the signal is then converted usually by a factor of ten (10) through an oscillator and mixer stage comprising a down block converter to a considerably lower intermediate frequency. This frequency is more conducive to transmission to the receiver by means of a less expensive transmission wire or conduit, such as a simple coaxial cable.

When working with the satellite transmission of television and audio signals and because of government regulations, the satellite system microwave signals cannot include local broadcast television channels and FM and AM broadcasted audio channels because of the political requirements for protection of these local broadcast facilities. Thus, the satellite user also requires the addition of local broadcast signals to the antenna system in order to acquire a complete spectrum of video and audio programming. This is usually accomplished by the provision of a separate VHF/UHF radio frequency antenna or cable TV input for the reception of the local programing frequencies. Thus, the present systems require the inclusion of a number of separate lead-in conduits from various signal sources, such as a terrestrial TV or microwave antenna, a satellite broadcast antenna, a cable TV transmission input as well as other types of video and audio programing input signals. All of these require individual and separate lead-ins, such as parallel open wire, coaxial cables or twin lead cables which feed from the outside of a home or structure along with separate satellite cabling to a suitable receiver. The signals are then combined within the receiver and/or converter before they are fed into a television set or monitor. In this way, a multitude of cumbersome lead-in cables are required to provide all of the programming sources which are desired.

Direct satellite broadcast systems generally use line-of-sight microwave and ultra high frequency (UHF) RF transmissions. In this part of the spectrum, radio frequency power losses associated with both feed lines and connectors are of major concern. This concern stems from the fact that at these high frequencies major loss of the signal can occur during the hard wire transmission of the signal through connectors and a coaxial cable from the antenna outside of the building to the receiver and TV located within the home or building. It is always a major concern to minimize these losses and to do it in an economical manner. As a result, it has been found that it is more economical and provides better results, if the frequency of the incoming received RF signal is down converted from the received microwave or ultra high frequency source to a lower intermediate frequency which can be transmitted more easily and efficiently over lower cost coaxial cable. As a result, various methods have been attempted in the past to provide these more efficient transmitting arrangements.

As an additional consideration for the receipt of the RF signals obtained in the direct broadcast satellite system, it has also been found that the use of polarization in the RF transmission can allow the same transmitting and receiving system to accommodate an increased amount of data and bandwidth which can be provided in the satellite system and used with the available satellite transponders. As a result, most DBS systems now utilize polarization of the transmitted radio wave. This is to say that, the transmitted RF bandwidth can be multiplied by transmitting identical bandwidths having the same frequency by the use of different polarization techniques.

Radio waves consist of electric and magnetic fields, both of which are always present and inseparable. The electric field can vary in magnitude, in direction or in both. If, at a particular point in space, the magnitude of the electric field remains constant while the direction changes, we have what is called circular polarization. If, on the other hand, the direction of the field remains constant, while the magnitude changes we have what is commonly called linear polarization. In addition, if both magnitude and direction are varying, we have elliptical polarization. Linear polarization is said to be both horizontally and vertically polarized; while circular polarization is said to be right hand circular polarized (RHCP) and/or left hand circular polarized (LHCP).

In many direct broadcast satellite systems the transmission from the satellite is usually both right and left hand circular polarized. In this way, the actual bandwidth of the data being transmitted can be doubled to increase the capacity of the satellite. Thus, two separate bandwidth signals are transmitted simultaneously and received by the receiving antenna. In this way, two separate data streams are received by the common satellite parabolic antenna and these two signals each have a specific bandwidth and can be handled and processed separately.

FIG. 1 shows a representation of a prior art type of satellite receiving system for the gathering and display of various incoming RF signal sources.

Along the left side of the figure is illustrated an antenna which, in essence, is a parabolic satellite antenna receiving downlinked microwave signals usually from a geostationary satellite. The frequencies of the received microwave signals are in the range of 12–13 Gigahertz. Because of the ability to receive polarized signals, the diagram illustrates the reception of signals in two separate frequency bands from the antenna 12. These are separate input signals and utilize the capability of the feedhorn or feed to separate the two polarized RF signals. Each signal is directly fed into a separate low noise amplifier and a separate block down converter 14, 16. The low noise amplifier amplifies the extremely low input signal received from the antenna and boosts it to a reasonable signal for processing. The block down converters include a mixer wherein the incoming RF signals are mixed with a local oscillator frequency signal whereby the incoming signals are combined and differentiated. The oscillator feeding the mixer contained within LNB 14 usually has a frequency of about 11.250 GHz. The oscillator feeding the mixer of the second LNB 16 is at a different frequency, such as about 10.650 GHz. The differential between the primary frequencies of the incoming signal and the oscillator signal provides the difference which is a considerably lower intermediate frequency. With the original incoming bandwidth approximately 500 MHz the output intermediate frequency from the first LNB 14 usually is in the range of 950–1450 MHz. The signal emitting from the second LNB 16 also has a bandwidth of approximately 500 MHz and lies in the frequency range of 1550–2050 MHz. In this way, there is two distinct band frequencies of 500 MHz each which are now at different base frequencies than the original incoming signals. These signals are then combined in a combiner included in the circuitry found within the feedhorn or feed 17 provided at the focal point of the parabolic satellite antenna. These incoming intermediate frequency bands contain all of the video and audio programming as well as the data provided in the TV satellite transmission. A coaxial cable 20 is fed from the combiner carrying the so called "stacked" intermediate frequency bands through the interface 21 of the support structure to the interior of the structure.

A common terrestrial television antenna 24 is usually mounted on the exterior portion of the structure and is tuned to receive local television and FM channels for both video and audio reception. These signals are, in turn fed through either a coaxial cable connected through an impedance matching transformer from the antenna or a twin lead TV cable through the interface 21 to the interior of the home or structure where the TV is located. By the same token, a commercial television cable input feed 28 can be connected through a coaxial cable 30. All of these input signals are connected to a combiner/distribution circuit 22 so that the RF signals are then distributed through appropriate cables to a plurality of IRD's 32–36 which, in turn, are connected to a TV receiver or monitor 38–42.

The diagram at the lower portion of FIG. 1, illustrates the frequency bands of the RF signals which are transmitted through the interface 21 from the exterior of the structure to the appropriate location where the equipment is located within the structure. The VHF band is relatively narrow in comparison with the UHF bands being broader in bandwidth. The signals received from the satellite include the direct broadcast satellite signals which can have left hand and right hand circular polarization. As shown, the bandwidth of these signals are considerably broader than those of the VHF and UHF signals.

As illustrated herein, the prior art commonly provides a plurality of cables for conveying the signals from various RF sources to the appropriate converters or receivers within the structure where they can be satisfactorily used.

The present invention eliminates the duplicity that is provided in the prior art and allows the conveyance of all input sources through one cable from the exterior of the structure to the interior. Thus, a much more inexpensive and efficient arrangement is provided which is easier and cheaper to install.

INFORMATION DISCLOSURE STATEMENT

The following information is provided in compliance with the inventor's duty to disclose all pertinent information which is the subject matter of this application. The listed patents are known to the applicant and are believed to be pertinent to the examination of this application.

The Kang patent (U.S. Pat. No. 5,119,509) discloses a satellite receiving system having the capability of receiving both the C band as well as the Ku band, simultaneously. The signals are separately amplified through low noise amplifiers and are passed through a band pass filter to a single mixer. Dual switchable oscillators are provided in the mixing stage to establish an intermediate frequency, having a frequency band of 950–1450 MHz. The intermediate frequency signals are processed through a low pass filter and an intermediate frequency (IF) amplifier and a biasing stage for supplying DC bias voltage to the low noise amplifiers, local oscillators and the IF amplifiers. Low voltage operating power is received from the outlet cable source, such as a satellite receiver. A suitable filtering stage is provided for separating the DC voltage from the RF signal. The DC voltage is used in powering the LNBF components. Although this patent teaches two separate input signal sources, it does not disclose the use of a diplexer for combining exterior signal sources for combining and transmission through a single cable to the satellite receiver.

The Mutzig et al. patent (U.S. Pat. No. 5,276,904) provides a system for simultaneous reception of satellites and UHF/VHF frequencies. A microwave frequency head or LNBF includes a microwave frequency demodulation circuit which selects a chosen channel and demodulates it. The circuit is controlled by the satellite receiver. The unit further includes an amplitude remodulation circuit which converts the signal to signals in the 40–860 MHz band which is the same as the VHF/UHF channels received by the terrestrial TV receiving antennas. This satellite signal is combined through a multiplexer with the terrestrial received signals and the combined signal is then transmitted through a single cable to a converter and/or satellite receiver. The multiplexer is disclosed as being used in conjunction with a UHF/VHF antenna. There are several circuits which are also disclosed in this patent which allow the demodulation of the satellite signal and the direct transmission of this signal to the associated receiver positioned within the home or structure. None of these disclosures teach the inclusion of a diplexer within the LNBF housing for combining the UHF/VHF TV antenna signals with the incoming satellite signals for producing a stacked band of frequencies for transmission through the single lead-in cable.

The Theriault patent (U.S. Pat. No. 4,397,037) discloses the use of a diplexer for combining UHF input sources along with high frequency as well as low frequency TV frequency sources. Through use of a number of filters, these input signals are combined and delivered to a mixer section for processing the signals in a subsequent section of a broadcast TV signal processor. This patent merely teaches the use of various high pass and low pass filters for impedance matching and blending of signals into a common mixer for producing an intermediate frequency for later processing. It does not disclose the use of a diplexer or filters in the LNBF of a direct broadcast satellite antenna system.

The Oleson patent (U.S. Pat. No. 4,675,732) discloses the processing of an incoming satellite antenna signal in a low noise block down converter mounted at the antenna. The output of the LNB is delivered to a splitter where it is divided into various individual signals. The satellite incoming signals can be combined with local UHF/VHF TV signals in a matrix and selectively distributed to attached TV sets. There is no teaching in this patent of any combining of the satellite signals and the terrestrial antenna signals at the antenna receiving head.

The Green et al. patent (U.S. Pat. No. 5,073,930) discloses a television distribution system which includes a frequency agile satellite transponder down converter operating in the 950–1450 MHz frequency band along with an IF stage incorporating band pass filtering and a frequency agile up converter. This allows an antenna configuration with optimum selection of transponders from one or more satellites and with opposite polarization. The frequency block can then be distributed to multiple subscribers in various locations. This patent discloses multiple satellite signal inputs, but does not disclose the processing of the frequency bands into a frequency stacked band configuration nor the combining of the terrestrial television antenna output with the satellite signal output through the use of a diplexer mounted within the LNBF housing.

The Japanese patent to Yoshida (patent No. 5-129977) discloses a circuit which allows plural satellite broadcast receivers. A plurality of input antennas covering both satellite transmissions as well as UHF/VHF TV antenna signals are connected through various band pass filters to a mixer for connection to a tuner or a receiver. This patent does not in any way disclose the combination of a diplexer for combining UHF/VHF TV antenna signals with the output signals from a satellite antenna.

The Shingematsu et al. patent (European patent application No. 576012-A2) discloses a digital broadcast receiver comprising a satellite frequency converter and a cable frequency converter which are combined within a television receiver which includes a tuning circuit for selecting the input signal, whether analog or digital in the associated receiver. While this patent discloses the combining of various input signals, it does not teach or disclose the use of a diplexer or the location of the diplexer in the LNBF of a satellite receiving antenna.

SUMMARY OF THE INVENTION

The present invention is directed primarily to a satellite parabolic antenna which has an LNB mounted within a housing and located at the focal point of the antenna. A wave guide collects the incoming RF radio frequency energy and directs the signal to a plurality of individual antenna probes. For the sake of illustration, the probes as disclosed and discussed herein are arranged for reception of right and left hand polarized incoming RF signals.

For the purpose of this invention, it is also possible to include horizontal and vertical polarized or elliptical signals. As will be discussed later, these inputs can be replaced by other types of inputs, such as terrestrial microwave signals as well as other incoming signals for transfer to a suitable receiver or TV monitor. For the present, the discussion will be directed to the use of antenna probes to receive separate bandwidths of right and left hand polarized incoming video and audio signals. Each of the incoming signals follows a separate processing path whereby the signals are introduced into a low noise amplifier (LNA) and a band pass filter where they are then processed through separate block down converters. Each of the block down converters includes a mixer for combining a local oscillator frequency for producing an intermediate frequency signal band which is, in turn, again amplified and passed through a band pass filter.

In this way, the incoming RF signals are converted and separated into individual signal streams or bands having defined bandwidths which are independent and spaced from each other. It has been found that the first incoming band can have an intermediate frequency in the range of 950–1450 MHz while the second RF signal band is converted to a different frequency range, such as 1550–2050 MHz. The local oscillator frequencies are selected so that approximately one hundred MHz is provided as an isolation or separation band between these two intermediate frequency ranges. These signal bands are then combined and passed through a wide band intermediate frequency (IF) amplifier to boost the signal strength to an acceptable level. The signal then is passed through a high pass/low pass filter for separating out a DC operating voltage of approximately 13–18 volts which is fed to the LNB by the coaxial or other lead-in cable connecting the LNB with the appropriate satellite receiver. The receiver is adapted to provide the voltage for operation of the components within the LNB. This DC voltage is then processed through a regulated power supply which, in turn, is connected with the individual components and sections of the LNB. A diplexer which is essentially a high pass/low pass filter is provided between the output from the wide band amplifier to the output connector on the LNB for transferring the received RF video and audio signals to the connected satellite receiver.

This invention provides the unique feature of permitting the additional connection and introduction of other RF signal sources, such as the signals received by a VHF/UHF terrestrial TV antenna or external cable TV input directly into the antenna housing for the LNB. In this way, all of the signals converging at the exterior of the support structure for the antenna systems can be combined through the diplexer provided in the housing for combining all of these incoming signals into a stacked band arrangement for transmission through the attached coaxial cable or lead-in wire for transfer to the appropriate satellite receiver or TV monitor. The auxiliary incoming signals are connected through the high and low pass filters of the diplexer for matching the incoming impedance of the signal sources and combining these signals into a single signal stream.

By the unique combination of components within the LNB housing, fewer exposed connections and couplings are provided with all of the existing components protected from weather and contamination. In this way, lower cost, better efficiency and more reliable transmission of signals is possible. In addition, all of the intermediate frequency signals are transmitted through one relatively inexpensive cable or lead-in wire to the satellite receiver found within the home or structure. In addition, the intermediate frequency signals are stacked so that the individual frequency bands are separated and positioned one above the other so that they do not overlap. In this way, the bands do not interfere with each other and provide an extremely wide range of incoming frequency video and audio reception.

BRIEF DESCRIPTION OF THE DRAWINGS

Other features and advantages of the present invention will become apparent from the following detailed description wherein like reference numbers denote the same elements in the accompanying drawings.

FIG. 2 shows a perspective view of a satellite antenna with the LNB and diplexer according to the present invention included within the feed housing;

FIG. 3 shows a detailed section of the components within the feed housing for the combining of the incoming radio frequency signals;

FIG. 4 is a block diagram showing a novel system of the present invention including the components within the LNB feed housing for combining the satellite as well as the external RF signals for connection to the appropriate satellite receiver;

FIG. 5 is a schematic of the diplexer shown in FIG. 4; and

FIG. 6 shows a diagram of the frequency separation between the combined intermediate frequency bands at the outlet of the LNB feed housing for direct connection to the appropriate satellite receiver.

DETAILED DESCRIPTION OF THE PREFERRED EMBODIMENTS

Figure 1:
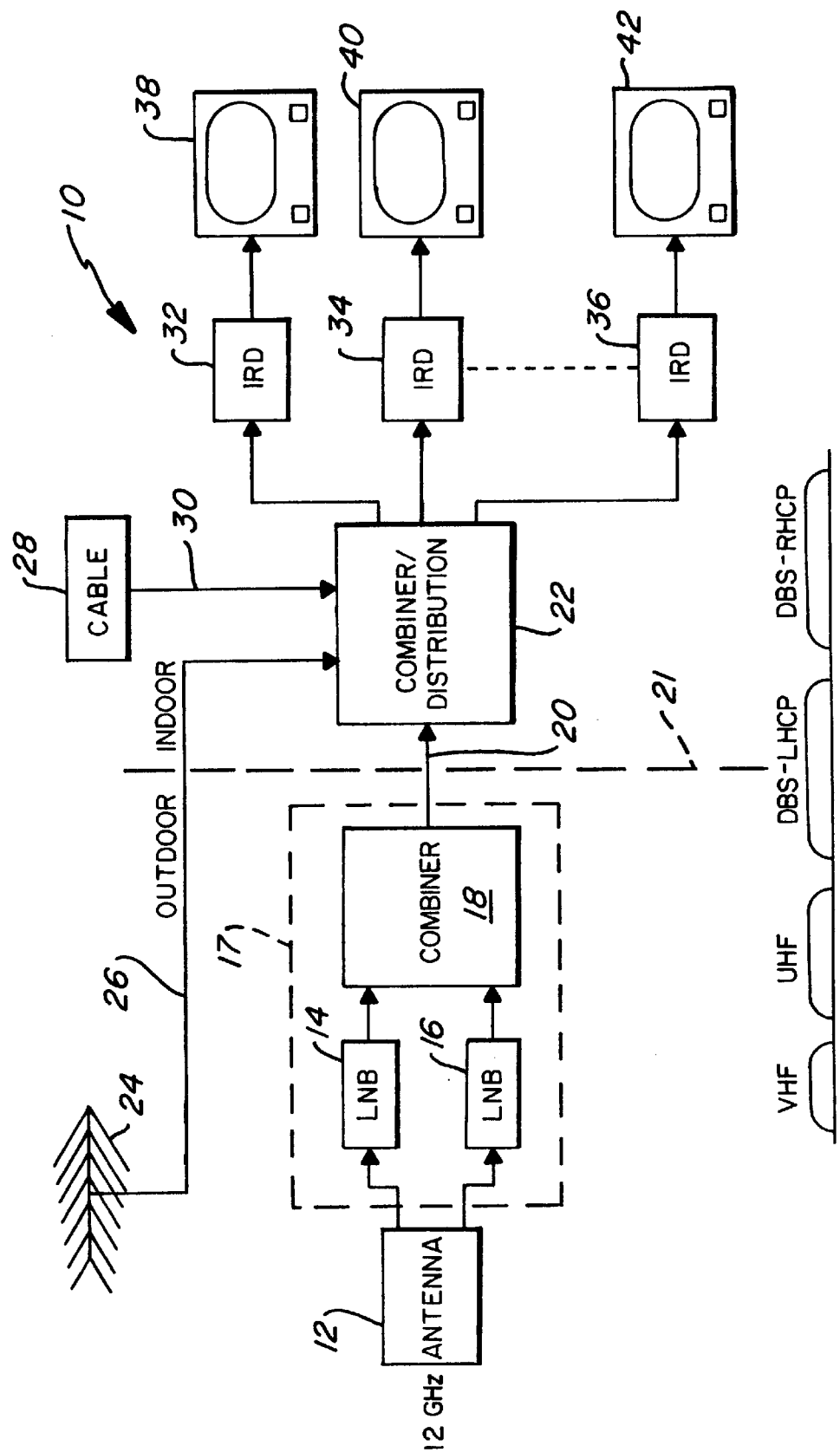
FIG. 1 is a block diagram showing a typical prior art system for connecting a plurality of incoming television signals for in home connection and use.

Turning now more specifically to the drawings, FIG. 2 shows a satellite type parabolic antenna 12 mounted on a support structure 14 and having an upwardly extending arm 16 mounted to bracket 18 and supporting an LNBF feed housing 20. A single output coaxial cable 22 is connected through the support arm 16 and LNBF feed housing for passage to the interior of the home or structure upon which the antenna is mounted. The cable 22 carries the output signals from the LNB housing and contains the satellite signals as well as any additionally attached auxiliary input signals. In this way, a single coaxial cable 22 carries all of the applicable RF signals for connection and operation to the satellite receiver and television set or monitor (not shown).

The LNB housing includes an outer plastic or non-metallic protective sleeve 24 and wave guide cover 26. The covers 24, 26 enclose and encapsulate a metallic tubular wave guide 28 as well as component housing 30. The component housing 30 contains a printed circuit board 32 including the components necessary for a plurality of low noise amplifiers, band pass filters, oscillators, mixers and IF amplifiers. In addition, antenna probes 36 are provided on the circuit board 32 for coupling the RF energy received through the wave guide 28. A regulated power supply is also provided on the printed circuit board 32 for powering the electronic components. Two or more Type F coaxial connectors 38 are mounted on a mounting board 40 which is positioned in the neck 42 of the housing 20. A second Type F connector 38 is arranged to be connected to a secondary or auxiliary input cable 44 which may be connected to a terrestrial VHF/UHF TV antenna or to other TV signal sources. The printed circuit board 32 also includes a diplexer (not shown) which is positioned between the output from the printed circuit board and the outlet Type F coaxial connector 38 attached to the transmission cable 22.

A watertight cover 34 is suitably mounted on the back of the housing 30 to seal and protect the components mounted within the LNB housing.

FIG. 4 is a block diagram showing the internal components mounted on the printed circuit board 32 and arranged to process the incoming signals received by the antenna 12 and guided through the wave guide 28 to the antenna probes 36. The satellite parabolic antenna 12 includes the feedhorn 20 precisely positioned at the focus of the antenna. The block diagrams which are shown in FIG. 4 are elements which are contained within the LNB feed housing 20.

The antenna probes 36 and 36a are mounted on the printed circuit board 32 and are precisely positioned within the wave guide 28 for receiving right hand and left hand polarized signals received by the antenna 12. Thus, dual parallel signal inputs are obtained through the antenna probes 36 and 36a for processing.

Antenna probe 36 receives the incoming radio frequency (RF) video and audio signals encompassing a wide frequency band. In the preferred embodiment of this invention, this band is in the range of 12.2 to 12.7 GHz. E1 designates the data signal stream received through the antenna probe 36 which is connected to a low noise amplifier (LNA) contained within a special isolation housing 46 to minimize the introduction of noise and interference. It is understood that the incoming RF signal at this point is quite low and the low noise amplifier 44 is designed to amplify the signal to a much higher lever without the introduction of noise and interference to the signal. The signal is fed from the low noise amplifier through a first band pass filter 48 to a first mixer 50. The incoming RF data signal having a frequency in the band of 12.2 to 12.7 GHz is mixed with the frequency from a local oscillator having a predetermined frequency of 11.250 GHz. As is well known in frequency mixers of this type, a summation and difference of the combined frequencies are produced. As a result, a high frequency RF band and a lower frequency RF band are produced and amplified in the preamplifier 54. The increased signal is then passed through an intermediate frequency band pass filter designed to allow the passage of the lower intermediate frequencies in the band of 950–1450 MHz to pass through. All other frequencies, including the high intermediate frequency band, are blocked. In the same way, the second input frequency signal stream 36a having the same input frequency band is fed through a second separate low noise amplifier 60 and second band pass filter 62 to the second mixer 64. A second local oscillator 66 having a lower frequency than the frequency found in the first local oscillator is fed directly to the second mixer 64. The oscillator frequency in the second local oscillator 66 can be predetermined at 10.650 GHz in order to provide an intermediate frequency downstream of the second mixer in the bandwidth of 1550–2050 MHz. As can be seen, this second intermediate frequency band encompasses a bandwidth of 500 MHz and is above the intermediate frequency bandwidth of 950–1450 MHz provided in the first signal source. In this way, there is a guard band of approximately 100 MHz provided between the intermediate frequency bands of the first and second signal sources. This is what is called a "stacked band" arrangement.

The combined resulting frequencies of the summation and difference of the frequencies introduced to the second mixer are passed directly through preamp 68 and the second intermediate frequency band pass filter 70. The second intermediate frequency band pass filer 70 filters out all of the extraneous frequencies except the desired intermediate frequencies in the 1550–2050 MHz frequency range. This band of frequencies is then introduced into the power combiner 72 along with the first source of incoming IF band frequencies. The first and second IF signal bands are combined in the combiner 72 to provide the "stacked band" arrangement mentioned above. The resulting signals are then fed through a wide band intermediate frequency amplifier 74. The output from the wide band amplifier 74 is then fed to a diplexer 78.

The diplexer 78 as shown in FIG. 5 provides the function of a high pass/low pass filter for the combining of the external auxiliary VHF/UHF input to the intermediate frequency band signals for passage through the RF output connector 86 to the connected satellite receiver. The diplexer provides a high pass filter through the output 84 from the wide band IF amplifier 74 containing the higher first and second intermediate frequency signal bands IF1, IF2.

The diplexer 78 is utilized in this arrangement since it provides the desired impedance matching at its respective inputs and output terminals. In addition, it permits signals from separate sources to be combined in a common circuit path without possible noise and distortion. In high pass filter 88, coupling capacitor C3 routes the combined UHF intermediate frequency signals through blocking capacitor C4 to internal circuit terminal 95. While, inductor L2 conducts relatively lower frequency signals to ground. Capacitors C3 and C4 are of relatively high capacitance to exhibit a relatively small impedance to signals at UHF frequencies. However, filter 88 shows a relatively high impedance at circuit terminal point 95 to lower frequency signals applied thereto from low pass filter 90. In high pass filter 88, capacitors C3 and C4 and inductor L2 serve as a simple 3 section filter and have values selected to cut-off at 950 MHz or slightly less. Thus, the high pass filter 88 has high impedance to the auxiliary lower frequency band which is being imported at the input terminal 38.

The low pass filter 90 of the diplexer 78 includes inductors L3, L4 in the line between the lower frequency band input terminal 38 and the circuit terminal point 95. A shunt capacitor C5 connected between the two inductors L3, L4 is connected directly to ground. Inductor L4 and shunt capacitors C5 and C6 serve as a simple 3 section filter and have a selective cut off value at or slightly above 812 MHz. In this way, low pass filter 90 presents a relatively high impedance to the higher frequency intermediate frequency bands so that these bands are directed through the internal terminal point 95 to the output 85 from the LNB. By the same token, the high pass filter 88 presents a relatively high impedance to the auxiliary lower input frequency band for VHF and UHF video and audio signals. The combined signals at output terminal 85 include essentially the three frequency bands shown in FIG. 5. These bands are stacked one above the other in series fashion and provide unique signal transmission to the applicable satellite receiver, tuner or TV monitor.

FIG. 6 shows a diagram of the output frequencies from the diplexer 78 at internal circuit point 95 and output connector 85. The upper line 102 at the left portion of the graph shows low impedance in the auxiliary VHF/UHF input frequencies with considerable frequency drop off past the cut off frequency of approximately 812 MHz in the low pass filter. The high pass filter 88 also has the same characteristics with respect to the satellite received intermediate frequency bands wherein a substantial drop off or insertion loss occurs at frequencies below 950 MHz. A node 106 occurs at approximately the mid-point in the cross-over in the bands between 812 and 950 MHz. The selection of the proper values for the components in the high pass and low pass filters produce high signal isolation between the satellite signal input 84 and the auxiliary signal input 38.

A common L/C filter 76 at the output of the diplexer 78 allows the IF signal to pass to the housing output connector 86. The coaxial cable 22 connected between the connector 86 and the satellite receiver provided within the protection of the home or structure provides a source of unregulated DC voltage of approximately 13–18 volts DC. This voltage is applied through the RF output connector 86. This voltage passes directly to the L/C filter 76 where the DC voltage is blocked by capacitor C1 and passes through the L1/C2 portion of the filter 76 and through the diode 82 to the power supply 80.

The power supply 80 provides a regulated reduced voltage of 5.0 volts to the low noise amplifier section 46, first and second local oscillators 52, 66 and the wide band intermediate frequency or IF amplifier 74. In this way, all of the components within the LNB housing are powered by the regulated power supply 80 from the connected satellite receiver.

It is important to understand that the novel results obtained in the present invention are produced by the inclusion of the diplexer within the LNB housing to minimize lead length between the LNB components and the diplexer for producing the combined stacked band frequency signals at the output 86 of the LNB. This is possible with the inclusion of the auxiliary inputs to the LNB housing for the combining of all of the desired frequency signals at the one output terminal. Thus, the components and connections are provided in a weather insulated environment to minimize contamination and prevent the introduction of noise and interference to the system.

Although throughout this application reference has been made to the introduction of only a single auxiliary input to the LNB housing, it is possible that a number of inputs can be provided and combined by providing additional diplexers or multiplexers with the LNB circuitry to provide the desired combined signal output.

While a combined satellite antenna LNB and diplexer within the single sealed housing of the LNB have been disclosed and described in this application, it should be understood that this invention is not to be limited to the exact form disclosed, and changes in the detail and construction of the invention may be made without departing from the spirit thereof.

What I claim is:

1. A satellite antenna system for receiving microwave signals and combining these signals with other auxiliary antenna signal sources for transmission of the combined signals through a single conductor cable to a processing unit positioned within a structure, the antenna system comprising;

a) a housing mounted with respect to a satellite antenna, said housing having a wave guide for receiving microwave radio frequency signals from said antenna, a plurality of exterior connectors for connecting a single output conductor cable and incoming auxiliary signal sources, and a cover for sealing said housing to form a weather proof enclosure;

b) one or more low noise block down converter circuits mounted within said housing for receiving, processing and conditioning the microwave antenna radio frequency signals received through said wave guide of said housing;

c) a diplexer circuit positioned within said housing and having a plurality of inputs and a single output connected to the output connector on said housing, the signals from said low noise block down converter circuits being connected to an input of said diplexer circuit; and d) one or more auxiliary signal sources connected to said housing connectors and said diplexer circuit input for combining within said diplexer all of the satellite signals and auxiliary signal sources so that the combined signals will be transferred to said processing unit.

2. A satellite antenna system as defined in claim 1 wherein the satellite signals received from the output of said block down converter circuits and the auxiliary signal sources combined in said diplexer circuit are defined in individual bands which do not overlap any other band whereby the signals are arranged in a stacked band arrangement for transmission to the processing unit positioned within the structure.

3. A satellite antenna system is defined in claim 1 wherein the single output conductor cable is connected to a low voltage DC power source and the low noise block down converter circuits within said housing include a filter circuit for separating the incoming DC voltage and directing it to a regulated power supply circuit provided in said housing for providing electrical power to the components within said housing.

4. A satellite antenna system as defined in claim 1 wherein the satellite antenna is a parabolic microwave antenna having a focal point and said housing is precisely positioned so that the wave guide of said housing is positioned at the focal point of said antenna.

5. A satellite antenna system as defined in claim 1 wherein one of the auxiliary signal sources connected to said housing and said diplexer circuit input is a terrestrial TV antenna.

6. A satellite antenna system for receiving microwave signals from a satellite and combining these signals with other auxiliary signal sources for transmission through a single conductor cable means to a processing unit positioned within a structure, the antenna system comprising:

a) a parabolic satellite antenna having a focal point;

b) a pair of low noise block down converter circuits for receiving and processing separate polarized data streams from said antenna into two separate intermediate frequency signal bands, said low noise block down converter circuits being mounted within a sealed housing mounted at the focal point of said satellite antenna;

c) a combining filter circuit mounted within said housing having an input connected to the intermediate frequency signal bands from said low noise block down converter circuits and an output connected to an exterior connector on said housing for connecting a single conductor cable for transfer of the resulting intermediate frequency signals to a processing unit positioned within a structure; and d) one or more auxiliary signal sources connected to connectors on said housing for connecting to an input of said combiner circuit whereby the auxiliary source is combined with the intermediate frequency signal banks to form an intermediate frequency stacked band output for transmission through said single conductor means.

7. A satellite antenna system as defined in claim 6 wherein the combining filter circuit is a diplexer.

8. A satellite antenna system as defined in claim 6 wherein the combining filter circuit is a multiplexer.

9. A satellite antenna system as defined in claim 6 wherein the single conductor cable means is a coaxial cable designed to accommodate the frequencies of the combined signals.

\* \* \* \* \*